United States Patent
Yang

(10) Patent No.: US 11,145,924 B2
(45) Date of Patent: *Oct. 12, 2021

(54) BATTERY STRUCTURE

(71) Applicants: Prologium Technology Co., Ltd., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 154 days.

This patent is subject to a terminal disclaimer.

(21) Appl. No.: 15/727,672

(22) Filed: Oct. 9, 2017

(65) Prior Publication Data

US 2019/0109304 A1 Apr. 11, 2019

(51) Int. Cl.
| | |
|---|---|
| *H01M 50/15* | (2021.01) |
| *H01M 10/04* | (2006.01) |
| *H01M 10/05* | (2010.01) |
| *H01M 50/11* | (2021.01) |
| *H01M 50/148* | (2021.01) |
| *H01M 10/052* | (2010.01) |
| *H01M 10/0585* | (2010.01) |
| *H01M 50/116* | (2021.01) |

(52) U.S. Cl.
CPC ..... *H01M 50/154* (2021.01); *H01M 10/0463* (2013.01); *H01M 10/0486* (2013.01); *H01M 10/052* (2013.01); *H01M 10/0585* (2013.01); *H01M 50/116* (2021.01)

(58) Field of Classification Search
None
See application file for complete search history.

(56) References Cited

U.S. PATENT DOCUMENTS

| | | | | |
|---|---|---|---|---|
| 4,164,068 A | * | 8/1979 | Shropshire | H01M 6/48 156/73.1 |
| 5,515,315 A | * | 5/1996 | Uda | G11C 7/1006 365/174 |
| 5,523,179 A | * | 6/1996 | Chu | H01M 10/05 429/104 |

(Continued)

FOREIGN PATENT DOCUMENTS

| | | | | |
|---|---|---|---|---|
| JP | 6052866 | * | 2/1994 | |
| JP | 2015-76179 | * | 4/2015 | Y02T 10/7011 |

*Primary Examiner* — Barbara L Gilliam
*Assistant Examiner* — Angela J Martin
(74) *Attorney, Agent, or Firm* — Rabin & Berdo, P.C.

(57) ABSTRACT

A battery structure is disclosed. The battery structure includes a first current collector layer, a first active material layer, a spacer layer, a first plastic frame, a second active material layer and a second current collector layer. The first active material layer is disposed on the first current collector layer. The spacer layer is disposed on the first active material and completely covers the top surface of the first active material layer. The first plastic frame is disposed on the side wall of the spacer layer and the top of the first plastic frame has a protruding part which extends to the top surface of the spacer. The second active material layer is disposed on the spacer layer and the protruding part. The second active material is isolated from the first active material via the space layer and the protruding part. The second current collector layer is disposed on the second active material layer.

16 Claims, 4 Drawing Sheets

(56) References Cited

U.S. PATENT DOCUMENTS

| | | | | |
|---|---|---|---|---|
| 7,166,385 B2* | 1/2007 | Ishida | ............... | H01M 2/0212 |
| | | | | 429/122 |
| 9,515,316 B2* | 12/2016 | Yokouchi | ............... | C23C 22/23 |
| 9,837,651 B2* | 12/2017 | Huang | ............... | H01M 2/168 |
| 2018/0108879 A1* | 4/2018 | Yang | ............... | H01M 10/0436 |
| 2018/0219247 A1* | 8/2018 | Park | ............... | H01M 10/045 |

* cited by examiner

BATTERY STRUCTURE

BACKGROUND OF THE INVENTION

Field of the Invention

The present invention relates to a battery structure, particularly to a lithium battery having a protective isolation structure.

Description of the Related Art

Portable electronic products are used in various industries, such as health, entertainment and so on. Portable electronic products in these industries are required to be lightweight, portable and versatile. The batteries used in these electronic products are required to be designed in accordance with the appearance of the portable electronic product, such as the outer package size, shape, and the like. Therefore, the flexibility of flexible batteries play an important role. FIG. 1 is a cross-sectional view of a conventional flexible lithium battery. As shown in FIG. 1, the flexible lithium battery 10 mainly comprises an upper collector layer 12, a under current collector layer 14, and an external package 16 disposed between the upper collector layer 12 and the lower collector layer 14. The upper collector layer 12, the lower collector layer 14 and the outer package 16 form an enclosed space 18. A first active material layer 20, a spacer layer 22 and a second active material layer 24 are provided in this enclosed space 18 in this order to form a electrochemical system layer. The first active material 20 is in contact with the upper current collector layer 12 and the second active material layer 24 is in contact with the lower current collector layer 14. The characteristic of the flexible lithium battery 10 is that the whole can be dynamically bent.

In addition, in the structural design of the lithium battery, the area of the horizontal plane of the cathode must be smaller than the area of the horizontal plane of the anode to avoid excessive lithium deposition to form lithium dendrites when the cathode is released beyond the acceptable lithium ions of the anode. The lithium dendrites will penetrate the isolation layer to cause the battery to be short-circuited. The present method of solving the above problem is to control the area of the horizontal plane of the cathode and the negative at the process. There is no other way to check again.

To overcome the abovementioned problems, the present invention provides a battery structure, so as to solve the afore-mentioned problems of the prior art.

SUMMARY OF THE INVENTION

A primary objective of the present invention is to provide a battery structure, which uses the first plastic frame to cover a part area of the spacer layer which correspond to the first active material layer and the second active material layer so as to maintain the A/C ratio of lithium battery and reduce the probability and degree of forming lithium dendrite.

To achieve the abovementioned objectives, the present invention provides a battery structure. The battery structure includes a first current collector layer, a first active material layer, a spacer layer, a first plastic frame, a second active material layer and a second current collector layer. The first active material layer is disposed on the first current collector layer. The spacer layer is disposed on the first active material and completely covers the top surface of the first active material layer. The first plastic frame is disposed on the side wall of the spacer layer and the top of the first plastic frame has a protruding part which extends to the top surface of the spacer. The second active material layer is disposed on the spacer layer and the protruding part, and isolated from the first active material via the space layer and the protruding part. The second current collector layer is disposed on the second active material layer.

Below, the embodiments are described in detail in cooperation with the drawings to make easily understood the technical contents, characteristics and accomplishments of the present invention.

DETAILED DESCRIPTION OF THE INVENTION

Figure 1:
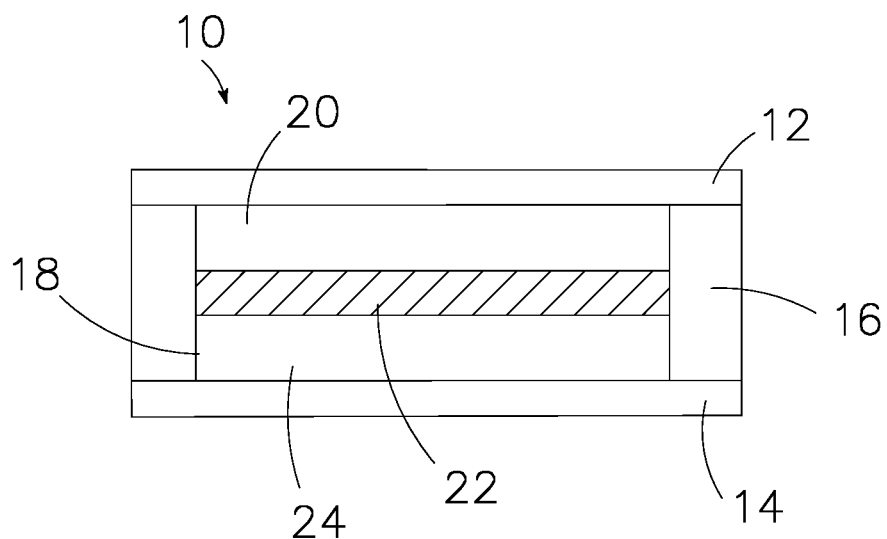
FIG. 1 illustrates the sectional view of conventional flexible battery.
Figure 2:
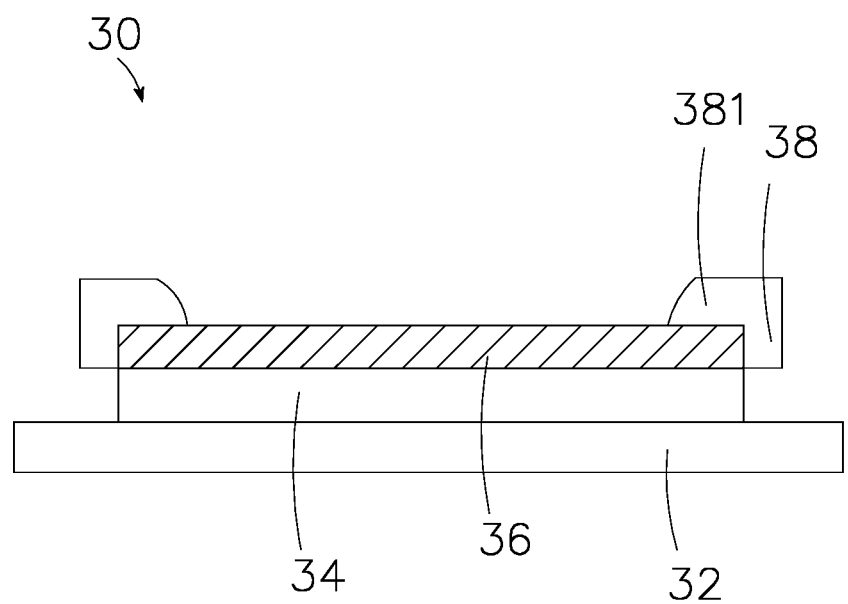
FIG. 2 is a schematic diagram of a partial cross-sectional view of the battery structure of the present invention.

Referring to FIG. 2, it is a partial cross-sectional view of the battery structure of the present invention. The lithium battery 30 comprises a first collector layer 32, a first active material layer 34, a spacer layer 36 and a plastic frame 38. The first active material layer 34 is disposed on the first collector layer 32. The area in the horizontal plane of the first active material layer 34 is smaller than the first current collecting layer 32 so that part of the first collector layer 32 is exposed to the outside of the first active material layer 34. The spacer layer 36 is disposed on the first material layer 34 and completely covers the top surface of the first active material layer 34. The plastic frame 38 is disposed on the side wall of the spacer layer 36 and extends to the top surface of spacer layer 36 to form a protruding part 381. The corner of the spacer layer 36 that is not in contact with the first active material layer 34 is covered by a plastic frame 38.

Figure 3:
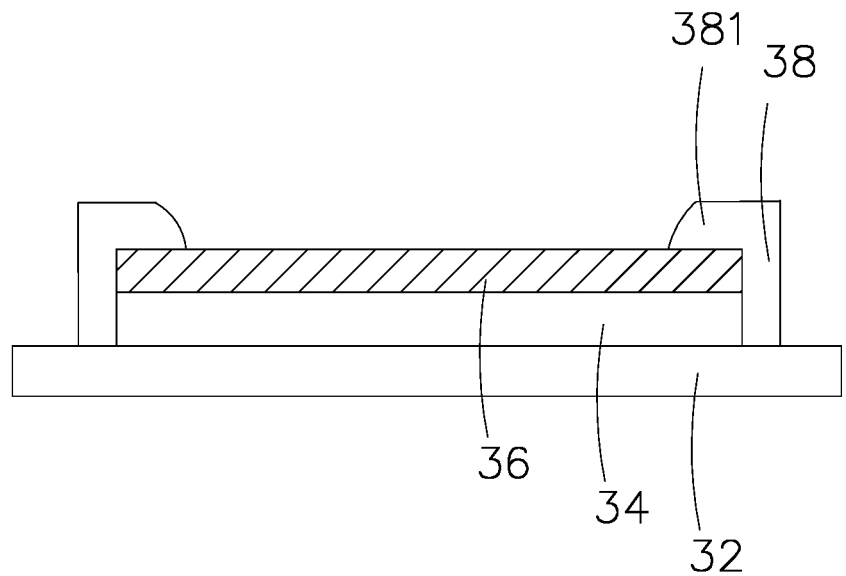
FIG. 3 is another schematic diagram of a partial cross-sectional view of the battery structure of the present invention.

In addition, a portion of the plastic frame 38 covering the side wall of the spacer layer 36 further extends to the side wall of the first active material layer 34. For example, a portion of the plastic frame 38 that covers the sidewalls of the spacer layer 36 extends downwardly to completely cover the side walls of the first active material layer 34, as shown in FIG. 3.

Figure 4:
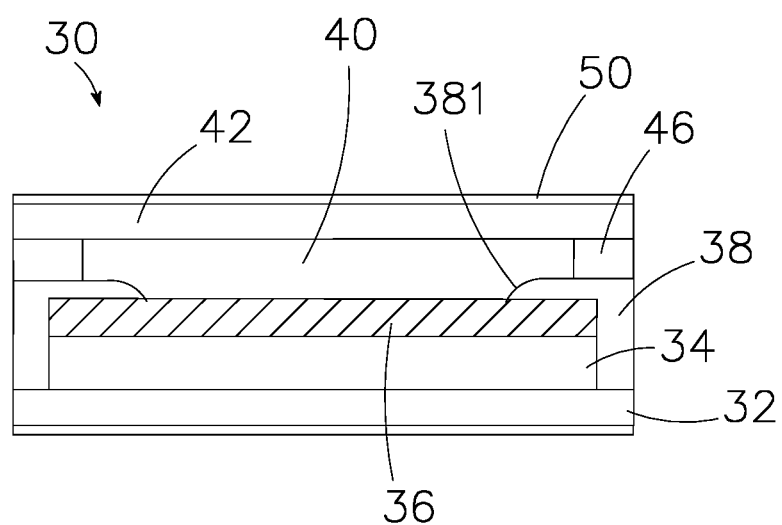
FIG. 4 is a schematic diagram of cross-sectional view of the battery structure of the present invention.

As shown in FIG. 4, the battery structure of the present invention further comprises a second active material layer 40, a second collector layer 42 and a second plastic frame 46. The second active material layer 40 is provided on the surface of the spacer layer 36 and the protruding portion 381. The second active material layer 40 is isolated from the first active material layer 34 by the spacer layer 36 and the protrusion 381.

The second current collector layer 42 is disposed on the second active material layer 40. The top of the second plastic frame 46 is disposed on the second current collector 42 and encloses the peripheral of the second active material layer 40. The bottom of the second plastic frame 46 is connect to the first plastic frame 38, more specifically, the bottom of the second plastic frame 46 is directly contact with the protruding part 381 of the first plastic frame 38.

In general battery design, the anode/cathode ratio usually control via the chemical recipe, coating area of electrode or coating density of electrode so as to reduce the probability and degree of forming lithium dendrite. However, in addition to above solutions, the present invention uses the protruding parts 381 masking the first active material layer to control the A/C ratio, and to maintain safety and electrical performance.

In addition to the above mentions, the protruding part 381 of the first plastic frame 38 extends to the edge of the top surface of the spacer layer 36 that improve the structural stability of lithium battery 30. For example, in flexible battery, the spacer layer 36 usually curved or deformation after bending several times and even cause inner short. However, the contact between the spacer layer 36 and the first active material layer 34 or the spacer layer 36 and the second active material layer 40 can be effectively maintained, and the deformation of the edge of the spacer layer 36 can be prevented when the protruding part 381 extends to the edge of the top surface of the spacer layer 36 regardless in polymer spacer layer, polymer spacer layer with special effect coating or ceramic spacer layer. The protruding part 381 effectively enhance the structural strength of the edge of the spacer layer 36 especially in ceramic spacer.

Moreover, in the above structure, the protruding part 381 of the first plastic frame and the spacer layer 36 form a new hybrid isolated structure that isolate the first active material layer 34 from the second active material layer 40. Furthermore, the first current collector layer 32 or the second current collector 42 can be the conductive surface of circuit board.

In addition, the outer surface of the first current collector layer 32 and/or the second current collector layer 42 further have/has a protection layer 50. The protection layer 50 can prevent the contact between outside environment with the first current collector layer 32 and/or the second current collector layer 42. The protection layer 50 can protect the first current collector layer 32 and/or the second current collector layer 42 from rupture during bending the lithium battery 30.

Figure 5:
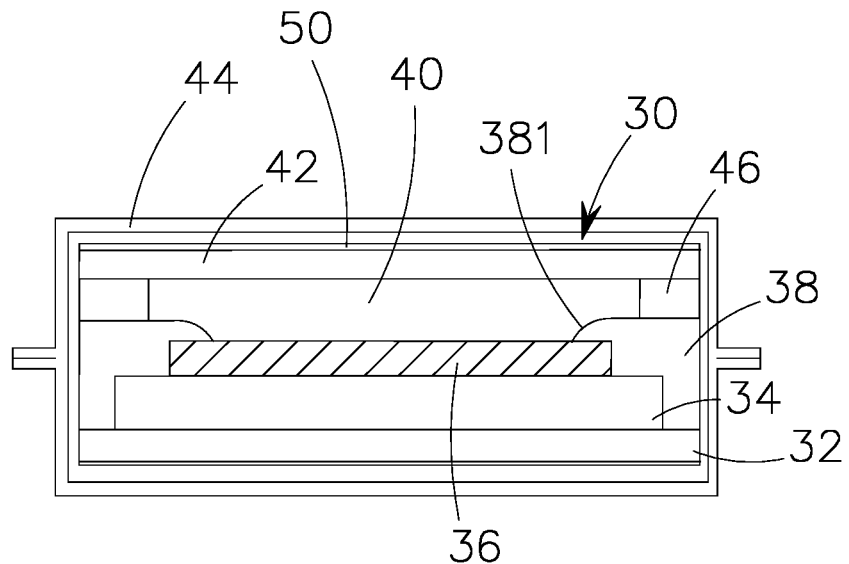
FIG. 5 is a schematic diagram of cross-sectional view of the battery structure of the present invention.

Please refer to FIG. 5, which pack the lithium battery 30 in an aluminum foil bag 44, the aluminum foil bag 44 can prevent the leakage of electrolyte and block moisture and oxygen from outside environment.

Figure 6:
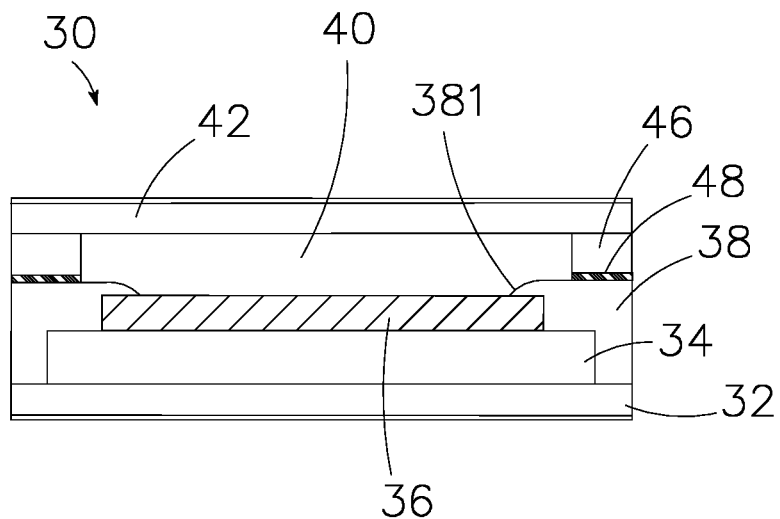
FIG. 6 is a schematic diagram of cross-sectional view of the battery structure of the present invention.

Please refer to FIG. 6, which illustrates another battery structure of this present invention. The lithium battery 30 further comprises a third plastic frame 48, the bottom of the second plastic frame 46 is connect to the top of the third plastic frame 48, the bottom of the third plastic frame 48 is connect to the top of the first plastic frame 38. The first plastic frame 38 and the second plastic frame 46 have the better heterogeneous surface adhesion than the third plastic frame 48, the third plastic frame 48 has the best homogeneous surface adhesion of the first plastic frame 38, the second plastic frame 46 and the third plastic frame 48. The third plastic frame 48 bonds the first plastic frame 38 and the second plastic frame 46 tightly.

Furthermore, the first plastic frame 38, the second plastic frame 46, the third plastic frame 48 and the protection layer 50 can further cover the edge of the first current collector layer 32 and the second current collector layer 42. The situation of external short that cause by the contact of the first current collector layer 32 and the second current collector layer 42 during bending of the lithium battery 30 can be reduced via the insulation characteristic of the first plastic frame 38, the second plastic frame 46, the third plastic frame 48 and the protection layer 50. The protection layer 50 could coat the edge of the first current collector layer 32 and the second current collector layer 42 in different structures depending on the battery design or the process requirements. The protection layer 50 may be single layer coating and multi-layer coating.

Figure 7:
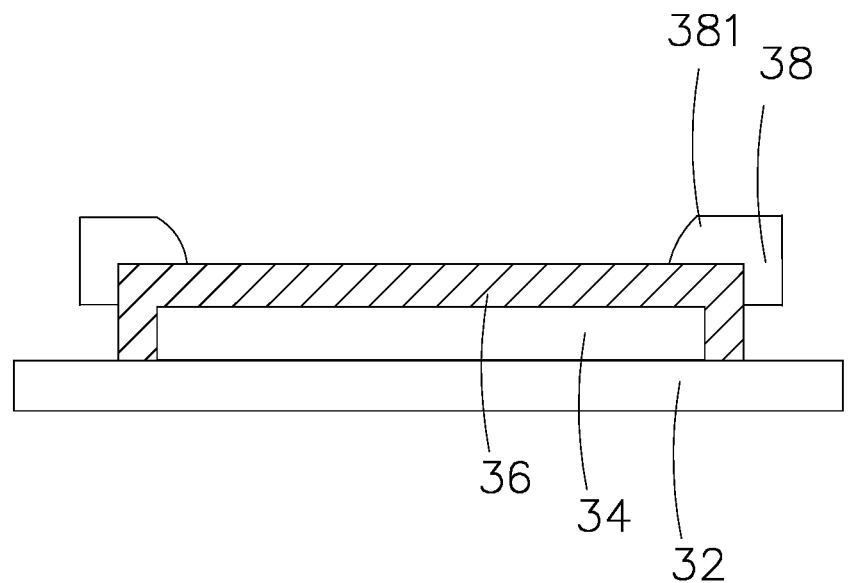
FIG. 7 is another schematic diagram of a partial cross-sectional view of the battery structure of the present invention.

Referring to FIG. 7, it is another partial schematic view of the battery structure of the present invention. The difference between the FIG. 7 and the FIG. 2 is that the spacer layer further extends to the sidewall of the first active material layer.

Figure 8:
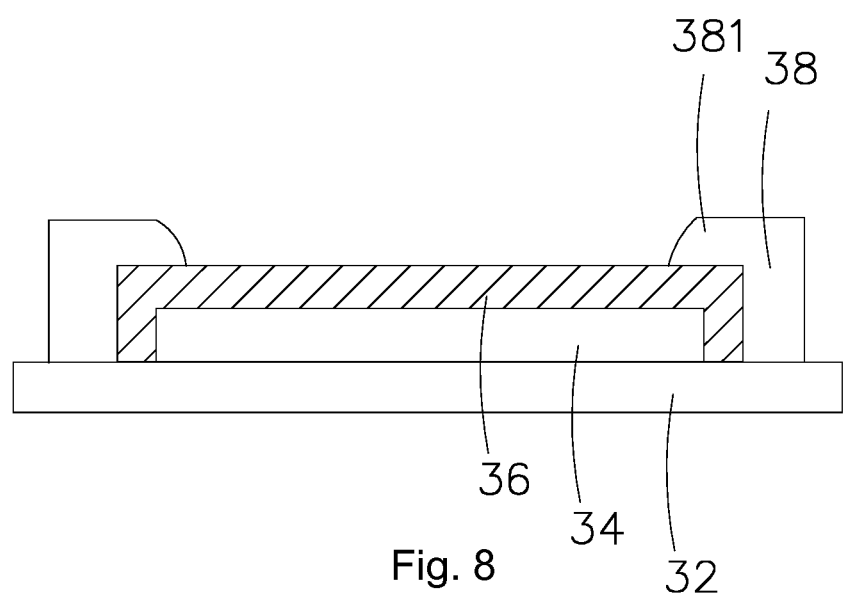
FIG. 8 is another schematic diagram of a partial cross-sectional view of the battery structure of the present invention.

Referring to FIG. 8, it is another partial schematic view of the battery structure of the present invention. The difference between the FIG. 8 and the FIG. 3 is that the spacer layer further extends to the sidewall of the first active material layer.

The materials of the first plastic frame 38, the second plastic frame 46, the third plastic frame 48 and the protection layer 50 are selected from the electric insulation polymer such as polyimide, epoxy, acrylic resin, and silicone. The materials of the spacer layer 36 are selected from polymer material, ceramic material, glass ceramic material or glass fiber material. The first active material layer 34, the second material layer 40 and the spacer layer 36 absorb an electrolyte. The electrolyte is liquid electrolyte, gel-type electrolyte or solid state electrolyte.

In summary, the A/C ratio of the lithium battery is effectively controlled by the protrusion part of the first plastic frame to reduce the probability and degree of forming lithium dendrite.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A battery structure, comprising:
    a first current collector layer;
    a first active material layer, disposed on the first current collector layer;
    a ceramic spacer layer, disposed on the first active material layer, the spacer layer completely covering a top surface of the first active material layer;
    a first plastic frame, disposed on a side wall of the spacer layer, the first plastic frame having a protruding part, the protruding part extending inwardly over a top surface of the spacer layer and directly contacting the top surface of the spacer layer;
    a second active material layer, disposed on the spacer layer and the protruding part and directly contacting the spacer layer and the protruding part, isolated from the first active material layer via the spacer layer and the protruding part, wherein the protruding part extends partly over the top surface of the spacer layer between the top surface of the spacer layer and a bottom surface of the second active material layer and beyond a peripheral surface of the spacer layer and a peripheral surface of the second active material layer; and a second current collector layer, disposed on the second active material layer.

2. The battery structure of claim 1, wherein portions of the first plastic frame covering the side wall of the spacer layer further extend to a side wall of the first active material layer.

3. The battery structure of claim 2, wherein an area in a horizontal plane of the first active material layer is smaller than a horizontal plane of the first current collector layer to expose parts of the first current collector layer.

4. The battery structure of claim 3, wherein a bottom of the first plastic frame is attached to the first current collector layer exposed from the first active material layer and the first plastic frame encloses the side wall of the spacer layer and the side wall of the first active material layer.

5. The battery structure of claim 1, further comprising a second plastic frame interposed between the first plastic frame and the second current collector layer, wherein
   a top of the second plastic frame is connected to the second current collector,
   the second plastic frame encloses a periphery of the second active material layer, and
   a bottom of the second plastic frame is connected to the first plastic frame.

6. The battery structure of claim 1, further comprising a second plastic frame and a third plastic frame, wherein
   the second plastic frame encloses a periphery of the second current collector,
   a bottom of the second plastic frame is connected to a top of the third plastic frame, and
   a bottom of the third plastic frame is connected to a top of the first plastic frame.

7. The battery structure of claim 6, wherein the first plastic frame and the second plastic frame have a better heterogeneous surface adhesion than the third plastic frame, and the third plastic frame has a best homogeneous surface adhesion of the first plastic frame, the second plastic frame and the third plastic frame.

8. The battery structure of claim 1, wherein the first current collector or the second current collector is a conductive surface of a circuit board.

9. The battery structure of claim 1, wherein materials of the first plastic frame are selected from polyimide, epoxy, acrylic resin or silicone.

10. The battery structure of claim 5, wherein materials of the first plastic frame and the second plastic frame are selected from polyimide, epoxy, acrylic resin or silicone.

11. The battery structure of claim 6, wherein materials of the first plastic frame, the second plastic frame and the third plastic frame are selected from polyimide, epoxy, acrylic resin or silicone.

12. The battery structure of claim 1, wherein the first active material layer, the second material layer and the spacer layer absorb an electrolyte, and the electrolyte is liquid electrolyte, gel-type electrolyte or solid state electrolyte.

13. The battery structure of claim 1, further comprising an aluminum foil pouch to accommodate and enclose the battery.

14. The battery structure of claim 1, wherein an outer surface of the first current collector layer and the second current collector layer has a protection layer.

15. The battery structure of claim 14, wherein materials of protection layer are selected from polyimide, epoxy, acrylic resin or silicone.

16. The battery structure of claim 1, wherein the spacer layer further extends to all of side walls adjacent to the top surface of the first active material layer.

* * * * *